United States Patent
Fukuda

(10) Patent No.: US 7,538,898 B2
(45) Date of Patent: May 26, 2009

(54) PRINTING APPARATUS, PRINTING CONTROL METHOD THEREFOR, AND INFORMATION PROCESSING APPARATUS

(75) Inventor: Tatsuya Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 930 days.

(21) Appl. No.: 11/028,183

(22) Filed: Jan. 4, 2005

(65) Prior Publication Data
US 2005/0146740 A1 Jul. 7, 2005

(30) Foreign Application Priority Data
Jan. 5, 2004 (JP) ............... 2004-000505

(51) Int. Cl.
*G06K 15/00* (2006.01)
(52) U.S. Cl. ..................... 358/1.14; 358/1.18
(58) Field of Classification Search ............ 715/744, 715/738, 513, 739, 745; 358/1.15, 1.6, 1.16, 358/1.18, 1.14, 448, 468
See application file for complete search history.

(56) References Cited

U.S. PATENT DOCUMENTS

| | | | | |
|---|---|---|---|---|
| 7,100,114 | B1* | 8/2006 | Burleson ............... | 715/744 |
| 2002/0063881 | A1* | 5/2002 | Nakata et al. .......... | 358/1.14 |
| 2003/0056177 | A1* | 3/2003 | Nara et al. ............. | 715/525 |
| 2004/0075682 | A1* | 4/2004 | Burleson ............... | 345/738 |
| 2004/0254840 | A1* | 12/2004 | Slemmer et al. ........ | 705/22 |
| 2005/0270579 | A1 | 12/2005 | Hibi et al. ............. | 358/1.16 |
| 2006/0064580 | A1* | 3/2006 | Euchner et al. ........ | 713/156 |

FOREIGN PATENT DOCUMENTS

JP  11-007701 A  1/1999

\* cited by examiner

*Primary Examiner*—Jerome Grant, II
(74) *Attorney, Agent, or Firm*—Fitzpatrick, Cella, Harper & Scinto

(57) ABSTRACT

There is provided a printing apparatus for printing an image stored in a mounted storage medium, wherein it is determined whether or not a second image being a duplicate of a first image stored in the storage medium, and upon printing of the images stored in the storage medium, printing of the second image is inhibited. The first image is displayed or printed by attaching an icon indicating that the second image being a duplicate of the first image, and/or a file path name of the second image.

15 Claims, 16 Drawing Sheets

FIG. 7

| LAYOUT POSITION | BASIC IMAGE PATH | NUMBER OF DUPLICATED IMAGE | FILE PATH 1 | FILE PATH 2 | |
|---|---|---|---|---|---|
| 1-Page (1,1) | CARD/Img00.JPG | 1 | Ext/Img00.JPG | - | - |
| 2-Page (1,1) | CARD/Pict1.JPG | 0 | - | - | - |
| ...... | ...... | ...... | ...... | ...... | ...... |

| BASIC IMAGE PATH | DUPLICATED IMAGE PRINT FLAG | NUMBER OF DUPLICATED IMAGES |
|---|---|---|
| CARD/Img.001.JPG | | |
| CARD/Img.002.JPG | | |
| CARD/Img.003.JPG | | |
| ⋮ | ⋮ | ⋮ |

113

F I G. 14

| LAYOUT POSITION | BASIC IMAGE PATH | NUMBER OF DUPLICATED IMAGE | FILE PATH 1 | FILE PATH 2 | ...... |
|---|---|---|---|---|---|
| 1-Page (1,1) | CARD/Img00.JPG | 1 | Ext/Img00.JPG | - | - |
| 1-Page (1,2) | CARD/Pict1.JPG | 0 | - | - | - |
| 1-Page (1,3) | CARD/Img01.JPG | 2 | CARD/back/Img01.JPG | Ext/Img00.JPG | - |
| ...... | ...... | ...... | ...... | ...... | ...... |

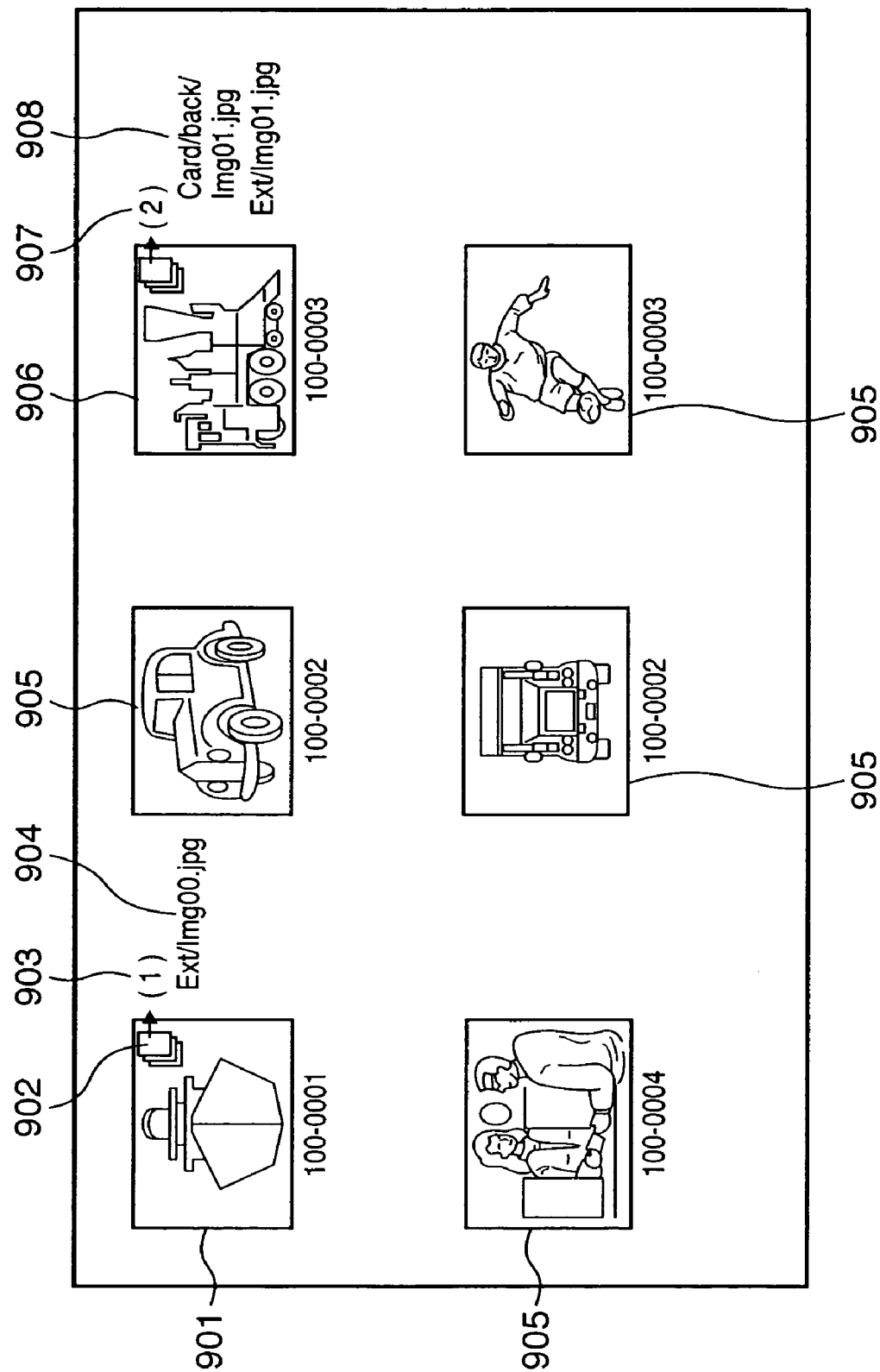

PRINTING APPARATUS, PRINTING CONTROL METHOD THEREFOR, AND INFORMATION PROCESSING APPARATUS

FIELD OF THE INVENTION

The present invention relates to a printing apparatus which receives image data stored in a storage medium mounted in the main body of the printing apparatus or image data from an external storage device connected to the printing apparatus and renders and prints the image data, a printing control method in the printing apparatus, and an information processing apparatus.

BACKGROUND OF THE INVENTION

There is commercially available a printer in which a memory card or the like is mounted and which can read out and print image data stored in the memory card, i.e., a so-called direct printer (see Japanese Patent Laid-Open No. 11-007701). Some direct printers can be used as general PC printers when they each comprise an interface with a host computer. Some can be used as apparatuses which can read/write data from/to memory cards mounted in the apparatuses. Some can be connected to digital cameras through cables or by radio, receive image data stored in the digital camera, and print an image.

The operation unit of such direct printer has a plurality of operation keys to designate print settings or various functions. The user can make various settings such as selection of an image to be printed, designation of the number of printed images, setting of the printing layout, and the like by operating the operation keys of the operation unit. If the printer is provided with a display for image display, it can display images on the display and select an image to be printed. There is also available a direct printer which can perform image editing such as adding a character string to an image to be printed or overlaying another image on the image to be printed using the operation unit.

A general procedure for using such direct printer will be described. Index printing is performed to show a list of all image data stored in a memory card while adding a unique character string such as an image number to each image. An image is selected from ones stored in the memory card and is printed using a number corresponding to the image obtained by the index printing. Direct printers to which an external storage device such as a hard disk can be connected each have a backup function of storing image data from a memory card in the external storage device. Some of these printers can preserve the image data of the memory card using the backup function. The printers can perform index printing of image data preserved in the external storage device and can print an image selected from the preserved image data.

The capacity of a memory card has rapidly been increasing in recent years, and the capacity of a memory card used in a digital camera has also been increasing. Along with an increase in memory card capacity, the entire capacity of each memory card is not consumed during one trip or the like. The same memory card can be used in photographing another event or the like without deleting photographed images in the memory card. In this case, image data photographed by a digital camera and stored in the memory card may temporarily be saved in the external storage device connected to the direct printer without deleting the image data in the memory card, and the memory card may be used again. In this case, previously photographed image data remains in the memory card. If the digital camera executes photographing using a free space in the memory card without initializing the memory card, the memory card contains the previously photographed image data in addition to newly photographed image data.

If image data of the memory card is repeatedly saved into the external storage device upon photographing in the above described situation, a plurality of identical image data are stored in the external storage device. If index printing for the image data stored in the external storage device or all image printing in which all images in the external storage device are printed one by one, or two or more at a time is performed, the identical images are printed for the number of the identical images. This wastes printing materials such as a printing sheet, ink, and the like. To specify duplicated images, it is necessary for index printing or all image printing of the image data stored in the external storage device, and a user compares the printed images with each other to determine whether they include identical images. This work is troublesome to the user.

SUMMARY OF THE INVENTION

The present invention has been made in consideration of the above-mentioned problems. The feature of the present invention is to provide a technique for, if a plurality of stored images include duplicated images, identifying them.

The present invention has as its feature to provide a printing apparatus which inhibits printing of the duplicated images if an instruction for image printing is issued, and a printing control method for the printing apparatus.

According to the present invention, there is provided with a printing apparatus for printing an image stored in a mounted storage medium, comprising:

determination means for determining whether a second image being a duplicate of a first image stored in the storage medium exists;

printing inhibition means for inhibiting printing of the second image determined by the determination means, in a case of printing images stored in the storage medium;

image processing means for reading out image data of images to be printed except for the second image inhibited by the printing inhibition means from the storage medium and converting the image data to generate print data; and printing means for printing in accordance with the print data generated by the image processing means.

Further, there is provided with a printing control method in a printing apparatus for printing an image stored in a mounted storage medium, comprising:

a determination step of determining whether a second image being a duplicate of a first image stored in the storage medium and/or external storage device, in a case where an external storage device is connected to the printing apparatus;

a printing inhibition step of inhibiting printing of the second image determined in the determination step, in a case of printing images stored in the external storage device and/or storage medium;

an image processing step of reading out image data of images to be printed except for the second image inhibited in the printing inhibition step from the external storage device and/or storage medium and converting the image data to generate print data; and a printing step of printing in accordance with the print data generated in the image processing step.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 depicts a chart for explaining layout data in all image printing according to the first embodiment;

FIG. 14 depicts a chart for explaining layout data in index printing according to the second embodiment;

FIG. 16 depicts a view showing a print example in index printing according to the second embodiment.

DETAILED DESCRIPTION OF THE PREFERRED EMBODIMENTS

Preferred embodiments of the present invention will be described in detail with reference to the accompanying drawings.

Figure 1:
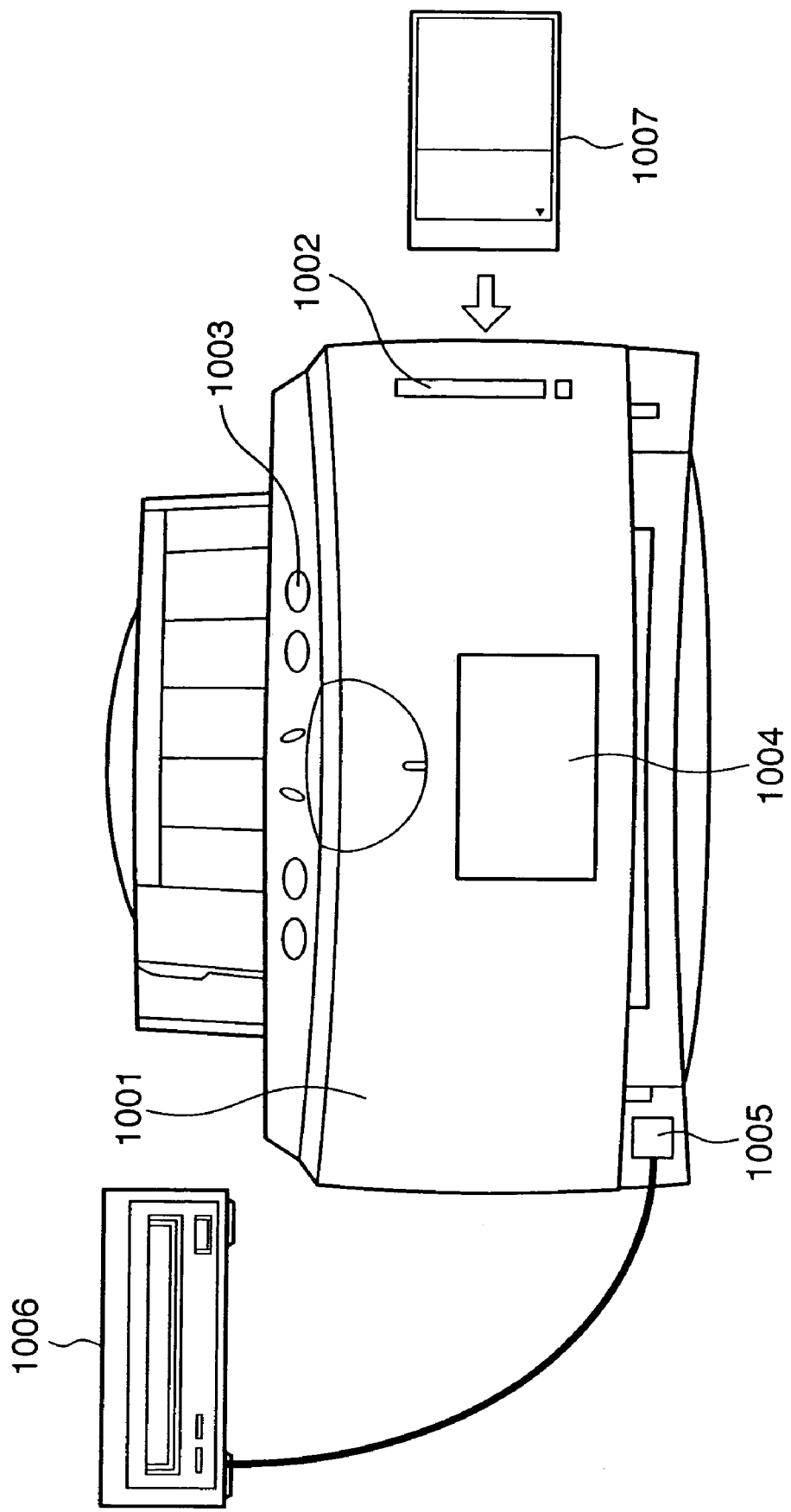
FIG. 1 depicts a view for explaining the outer appearance of a direct printer according to an embodiment of the present invention.

FIG. 1 depicts a view of the outer appearance of a direct printer according to an embodiment of the present invention.

In FIG. 1, a direct printer 1001 comprises a card mounting unit 1002 for mounting a memory card 1007 which stores image data photographed by a digital camera or the like. In this embodiment, the card mounting unit 1002 may accept memory cards having different shapes through an adapter or may comprise a plurality of mounting units to fit the shapes of separate memory cards. An operation unit 1003 is used to select an image to be printed, set the print mode, and the like. The user can designate various print settings, maintenance, and the like of the direct printer 1001 by operating the operation unit 1003. A display unit 1004 aims at displaying various kinds of information in the direct printer 1001. The state of the direct printer 1001, images to be printed, setting items in printing, or the like can be displayed on the display unit 1004. Although not shown, the direct printer 1001 comprises an interface for connecting to a host computer (external device) on the back. The direct printer 1001 can be connected to the host computer through the interface and can be used as a general PC printer. The direct printer 1001 can also be used as a memory card reader for reading/writing data from/to a memory card mounted in the direct printer 1001. An external storage device (hard disk) 1006 is connected to the direct printer 1001 through an interface 1005 of the direct printer 1001. Note that the external storage device (hard disk) 1006 may be incorporated in the direct printer 1001.

Figure 11:
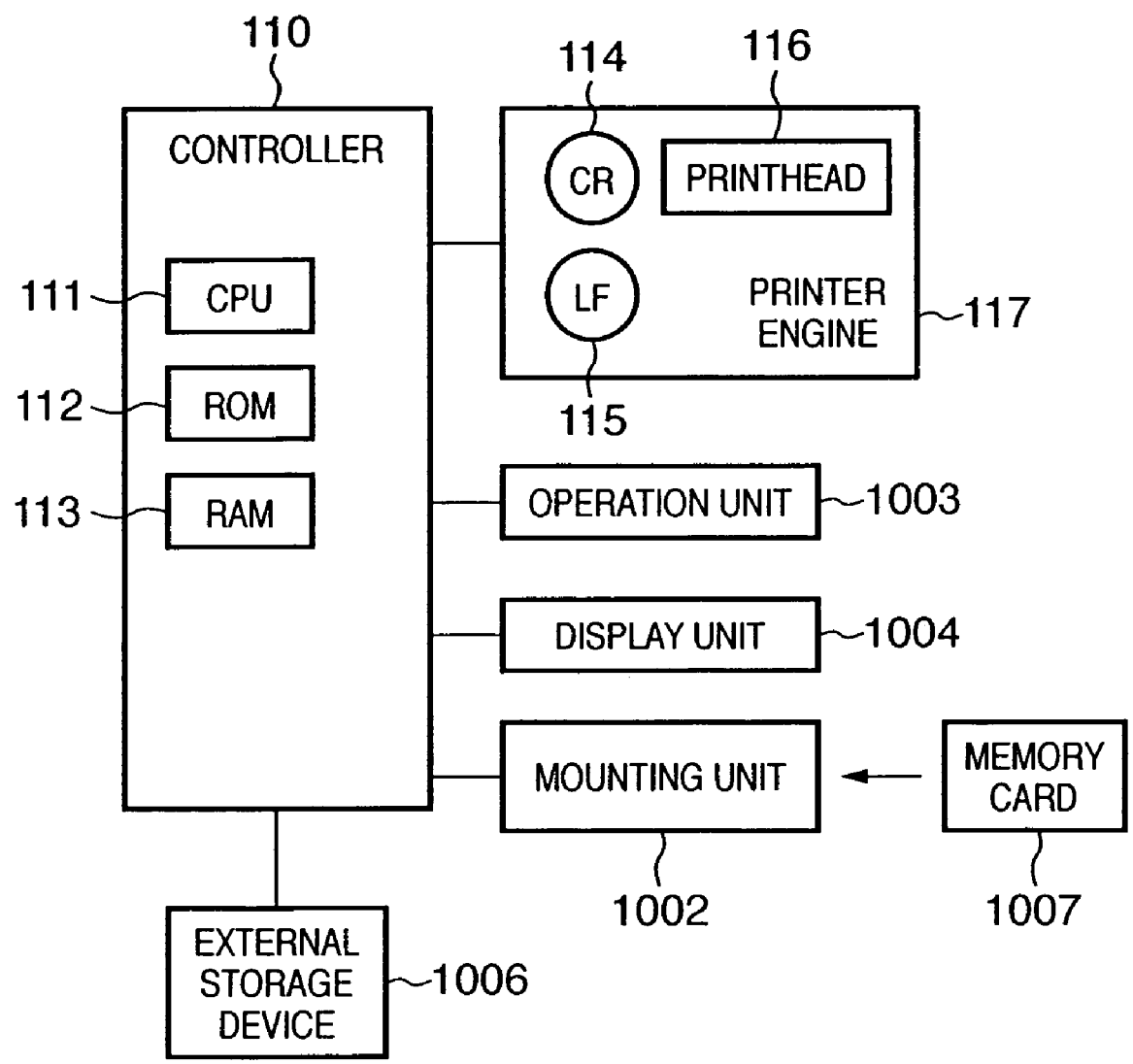
FIG. 11 is a block diagram for explaining the schematic arrangement of the direct printer according to this embodiment.

FIG. 11 is a block diagram for explaining the schematic arrangement of the direct printer 1001 according to this embodiment. The same reference numerals in FIG. 11 denote the same parts as in FIG. 1, and a description thereof will be omitted.

In FIG. 11, a controller 110 comprises a CPU 111 such as a microcomputer, a ROM 112 which stores a program executed by the CPU 111, data, and the like, a RAM 113 which is used as a work area in control operation by the CPU 111 and temporarily stores various kinds of data, and the like, and controls the operation of the entire printer 1001. A printer engine 117 comprises a carriage motor 114, paper feed (LF) motor 115, printhead 116, and the like. The printer engine 117 prints an image on a printing medium such as a printing sheet or the like in accordance with print data supplied from the controller 110. The direct printer 1001 will be described as a color ink jet printer which discharges a plurality of color inks to print a color image. However, a printing apparatus according to the present invention is not limited to this type of printer.

Figure 2:
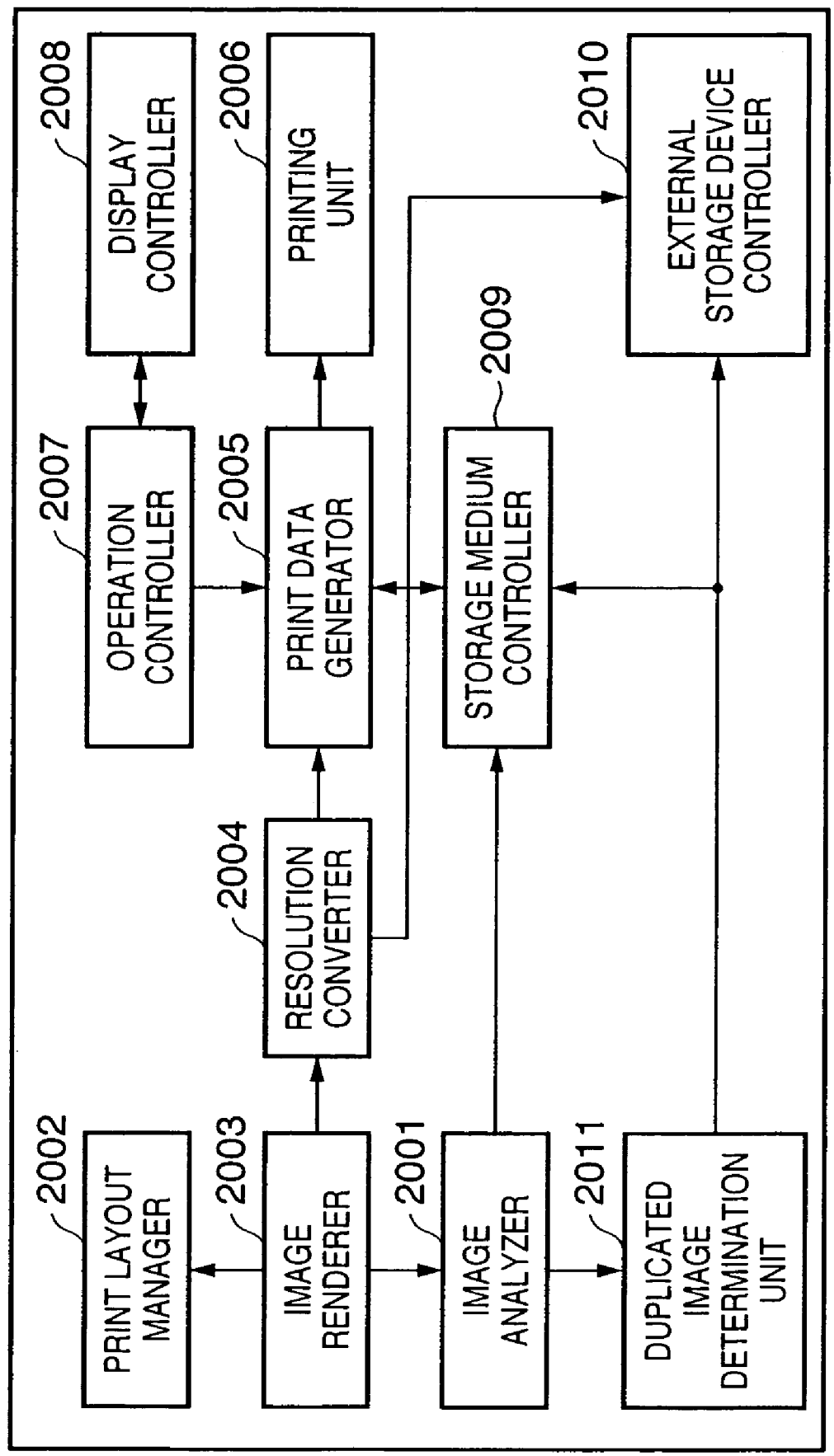
FIG. 2 is a block diagram for explaining an example of the functional arrangement of a direct printer according to the first embodiment.

FIG. 2 is a block diagram for explaining the functional arrangement of the direct printer 1001 according to this embodiment. In this embodiment, units to be described later are implemented by a control program stored in the ROM 112 and the CPU 111 in FIG. 11.

Referring to FIG. 2, an image analyzer 2001 analyzes image features such as the image size and pixel bit depth (the number of multilevel bits) of image data stored in the memory card 1007 mounted in the card mounting unit 1002 of the direct printer 1001 or the external storage device 1006 connected to the direct printer 1001. A print layout manager 2002 manages the layout position and layout size based on the layouts of images to be printed. An image renderer 2003 decodes input encoded image data and renders the decoded data into a bit image. A resolution converter 2004 converts the resolution of image data rendered by the image renderer 2003 in accordance with the print layout. A print data generator 2005 converts the image data arranged at the layout position managed by the print layout manager 2002 into print data. A printing unit 2006 outputs the print data generated by the print data generator 2005 to the printer engine 117 and causes the printer engine 117 to print an image corresponding to the print data. An operation controller 2007 is used by the user to select one from images stored in the memory card 1007 or the external storage device 1006 connected to the direct printer 1001, designate the number of printed images for the selected image, and set a setting item such as the print mode or the like.

A display controller 2008 performs control for display an image ID (a number of image) corresponding to image data stored in the memory card 1007 or the external storage device 1006 connected to the direct printer 1001, the state of the printer, an item being set, or the like. A storage medium controller 2009 manages a memory card (storage medium) mounted in the card mounting unit 1002. An external storage device controller 2010 controls writing/reading of data to/from the external storage device 1006 connected to the direct printer 1001. A duplicated image determination unit 2011 determines whether identical images exist in image data stored in the external storage device 1006 and image data in the memory card 1007 mounted in the card mounting unit 1002 or whether identical images exist between the external storage device 1006 and the memory card 1007.

The operation of the direct printer 1001 having the above-mentioned arrangement according to the embodiment will be described below. In the following description, a case will be explained in which it is determined whether duplicated images exist between the memory card 1007 and the external storage device 1006, and if an instruction to print all frames is issued, all images in which the identical image doe not exist are printed and only one of duplicated images is printed if the identical images exist, and an icon indicating the presence of the identical image and the number of identical images are displayed on the display unit 1004 of the direct printer 1001.

Figure 3:
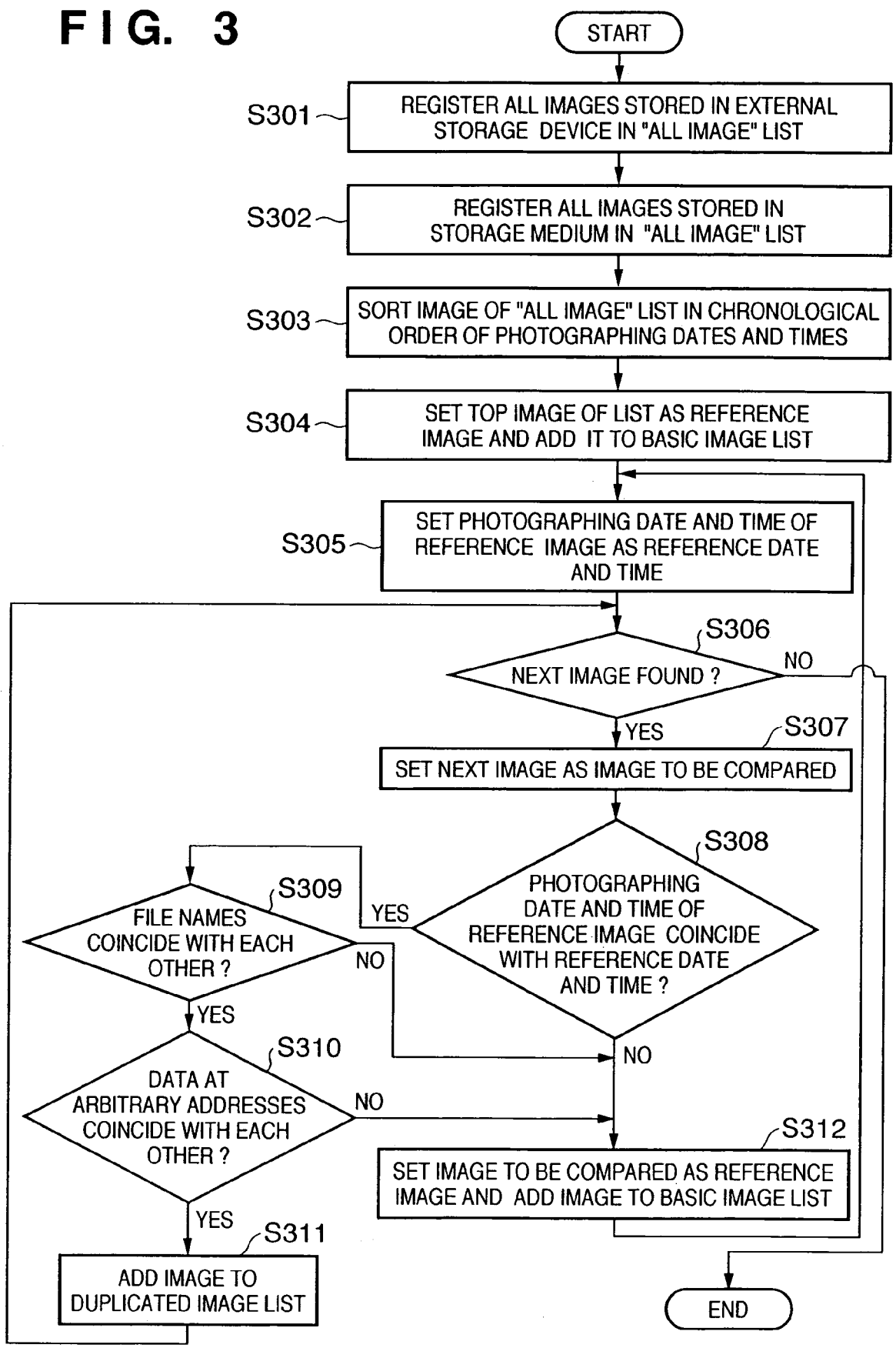
FIG. 3 is a flowchart for explaining a duplicated image determination process according to the first embodiment.

FIG. 3 is a flowchart for explaining the operation of the direct printer 1001 according to the embodiment. A program for executing the process is stored in the ROM 112 and is executed under the control of the CPU 111.

In step S301, a list of all image data stored in the external storage device 1006 (external "all image" list) is generated. In step S302, a list of all image data stored in the memory card 1007 (card "all image" list) is generated.

Figure 4:
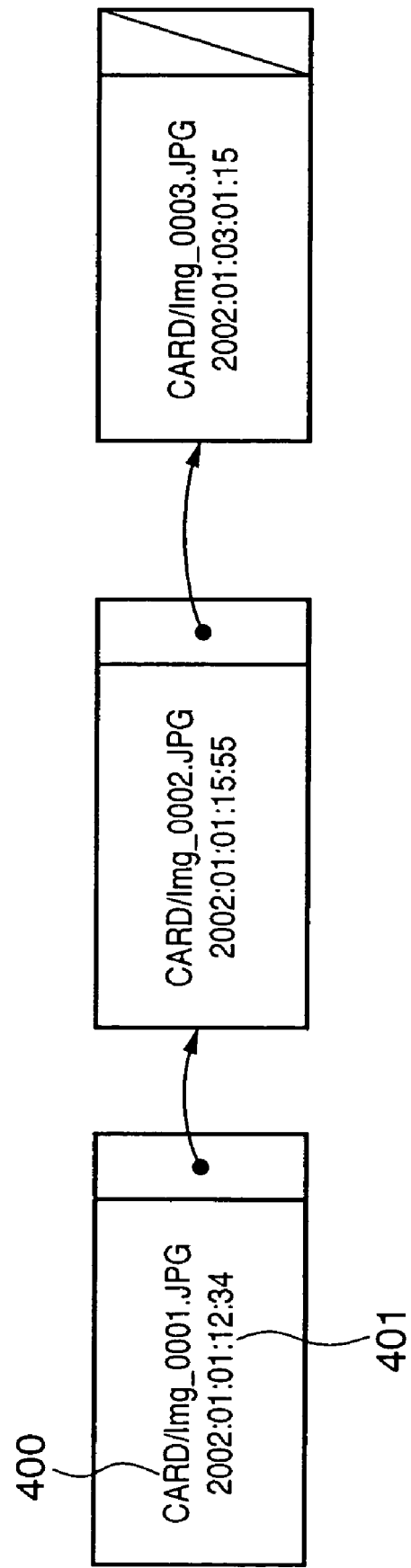
FIG. 4 depicts a chart for explaining an image data list stored in an external storage device connected to a memory card and direct printer according to this embodiment.

FIG. 4 depicts a chart for explaining a data structure of the card "all image" list.

FIG. 4 shows an example wherein the memory card 1007 contains three images. The "all image" list has a one-way list structure. The full path of each file and photographing date and time are registered as information in the "all image" list. Referring to FIG. 4, "CARD" included in the name of each image data indicates that the image data is stored in the memory card 1007. Reference numeral 401 denotes a date and time when the image is photographed. For example, "2002:01:01:12:34" indicates that the image is photographed at the time of 12:34 on Jan. 1 in 2002. If the list is generated when the memory card 1007 is mounted in the direct printer 1001 or the external storage device 1006 is connected to the direct printer 1001, a delay in generating the list can be eliminated. The image list (external "all image" list) stored in the external storage device 1006 has the same structure except that a portion "CARD" indicating a memory card is replaced with "Ext".

The flow advances to step S303. In step S303, image data of the external "all image" list and those of the card "all image" list are sorted in the chronological order of photographing dates and times to generate a sorted image list. Sorted image data in the chronological order of photographing dates and times makes it possible to efficiently determine whether image data contains duplicated images, regardless of the file path, the date and time when the image data is copied, and the like.

The flow advances to step S304. In step S304, image data at the top of the sorted image list is added to a basic image list as reference image data for determining image duplication. In step S305, the photographing date and time of the image data at the top is set as a reference date and time (comparison reference date and time) for comparison.

Figure 5:
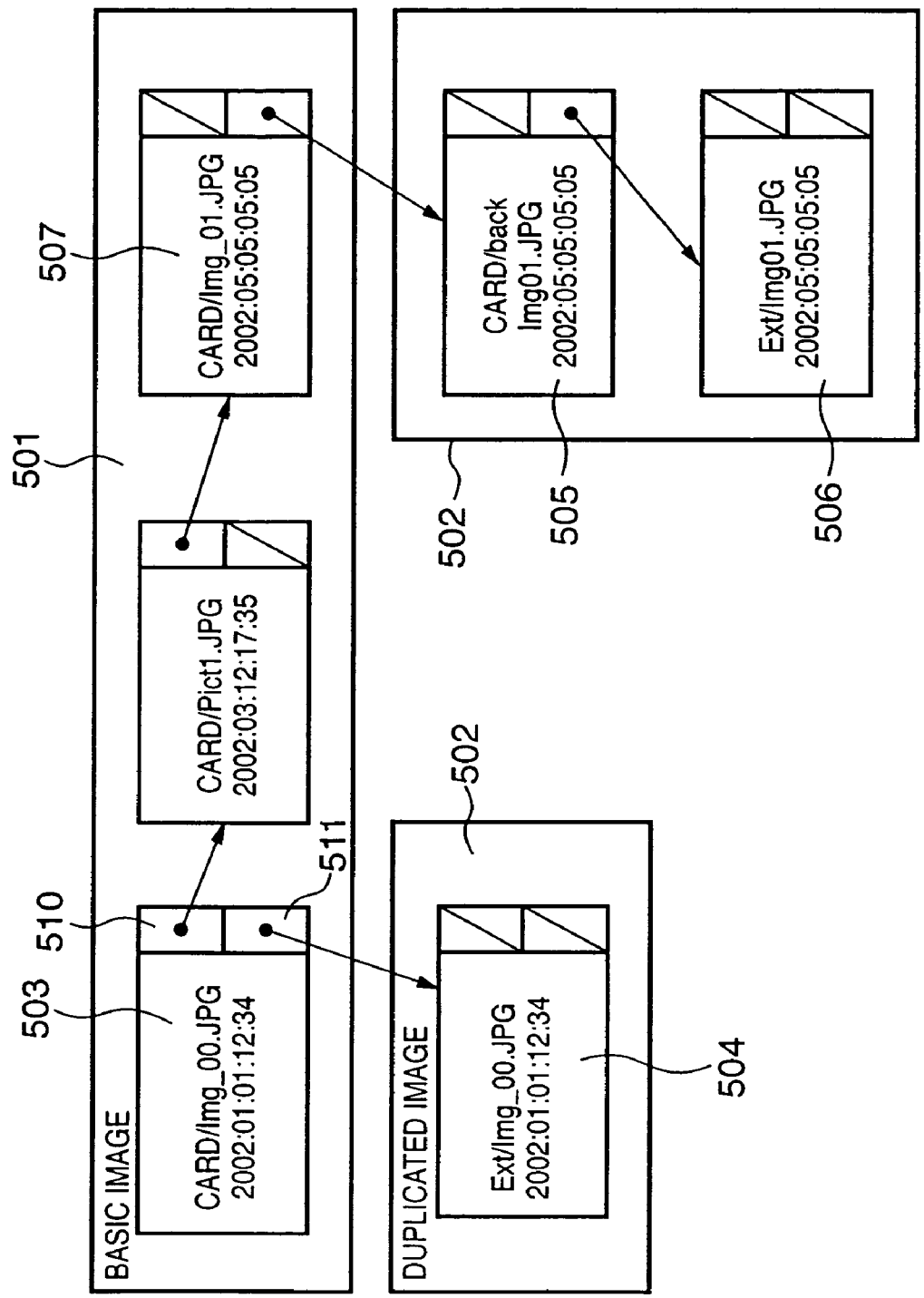
FIG. 5 depicts a chart for explaining a duplicated image list in the image data stored in the external storage device connected to the memory card and direct printer according to this embodiment.

FIG. 5 depicts a chart for explaining the list structures of a basic image list 501 for determining image duplication and a duplicated image list 502.

In this example, the basic image list 501 is an image list in which duplicated images are excluded from images arranged in the chronological order of photographing dates and times. The duplicated image list 502 is an image list of duplicated image which is an identical image of that of the basic image list 501. Each basic image is linked to the corresponding duplicated image. More specifically, in FIG. 5, reference numeral 510 denotes a pointer pointing a position of subsequent image data in image data in the basic image list 501; and numeral 511 denotes a pointer pointing a position of duplicated image data in the duplicated image list 502, which is the same as image data in the basic image list 501 or in the duplicated image list 502. Accordingly, the pointer 511 of image data which has no duplicated image such as an image (CARD/Pict1.JPG) is vacant or null. The pointer 510 of image data which has no subsequent image data (last image data) is vacant or null.

In the example of FIG. 5, image data 504 photographed at the same date and time as a top image 503 of the basic image list 501 is determined to be a duplicated image and is added to the duplicated image list 502. Image data 505 and 506 photographed at the same date and time as an image 507 of the basic image list 501 are determined to be duplicated images and are added to the duplicated image list 502.

This process will be described. In step S306, it is determined whether the next image data exists in the sorted image list. If NO in step S306, the process ends. If YES in step S306, the flow advances to step S307 to set the image data as an image to be compared. In step S308, the photographing date and time of the image to be compared is compared with the comparison reference date and time. If the comparison result shows that the photographing date and time coincides with the comparison reference date and time, the flow advances to step S309 to compare file names except folder paths ("CARD/" or "Ext/"). If the file names coincide with each other, the flow advances to step S310 to compare data at an arbitrary address in the image files (image data). If the comparison result shows that the data at arbitrary addresses coincide with each other, it is determined that the two image data (image files) are identical to each other. The flow advances to step S311. In step S311, the compared image data is added to the duplicated image list 502, and the flow returns to step S306.

If the photographing date and time does not coincide with the comparison reference date and time in step S308, the file names do not coincide with each other in step S309, or the data at arbitrary addresses do not coincide with each other in step S310, the flow advances to step S312. In step S312, the compared image is determined to be non-duplicated image data. The image is set as the reference image data and is added to the basic image list 501. The flow returns to step S305. In this case, the photographing date and time of the newly added image data becomes the comparison reference date and time. If determination for all image data of the sorted image list has ended in step S306, the process ends.

With this process, the duplicated image list 502 shown in FIG. 5 is generated. With the duplicated image list 502, duplicated image data in either or both of the external storage device 1006 and the memory card 1007 can be detected. The procedure for determining duplicated images uses photographing dates and times, file names, and data at arbitrary addresses of files as criteria for duplicated images. To check duplicated images more severely, the whole contents of image data may be compared. With this comparison, the precision of determination of image duplication can be increased. The criteria for duplicated images are not limited to those described above. Photographing modes, generation dates and times of image files, and the like may be used as criteria.

Figure 6:
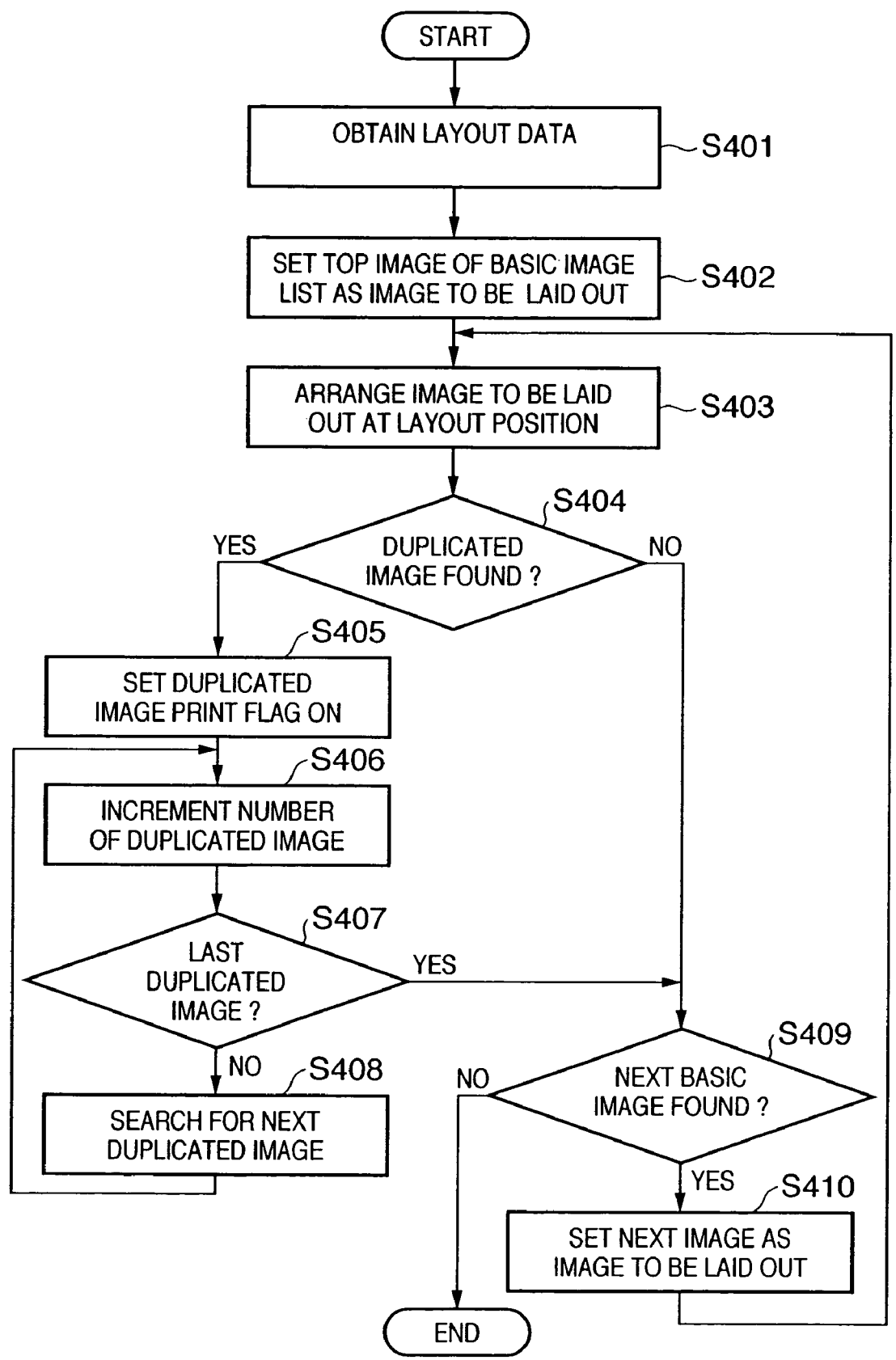
FIG. 6 is a flowchart for explaining the procedure for performing a layout process using the duplicated image list according to the first embodiment.

FIG. 6 is a flowchart for explaining a method of arranging images in a designated layout in printing images stored in the external storage device 1006 and memory card 1007 using the duplicated image list 502 generated by the procedure in the direct printer 1001 according to this embodiment. A program for executing the process is stored in the ROM 112 and is executed under the control of the CPU 111.

The process starts, for example when an instruction to print all images is issued by the user's operation. In step S401, layout data indicating the designated layout is obtained from the print layout manager 2002. The number of images to be laid out on one sheet, the layout position of each image, and the layout size are obtained from the layout data. The flow advances to step S402 to set the top image data of the basic image list 501 as an image to be laid out. In step S403, the image is laid out at the corresponding layout position. In step S404, it is determined whether an identical image of the image data exits. As described with reference to FIG. 5, the determination can easily be performed by referring to the pointer 511 of the image data. If an identical image exists, the flow advances to step S405 and a duplicated image flag indicating that the identical image exist is set. Next in step S406, a counter for counting the number of duplicated images is incremented. The flow advances to step S407 to determine whether the duplicated image is the last image of the identical images of the basic image. If NO in step S407, the flow advances to step S408. In step S408, the next duplicated image is looked for in the duplicated image list 502. The flow returns to step S406 to increment the counter for counting the number of duplicated images. By repeating steps S406 to S408, the number of duplicated images for the basic image can be counted. If the last duplicated image for the basic image is found in step S407, the flow advances to step S409.

The duplicated image print flag and the counted number of duplicated images will be described.

Figure 12:
FIG. 12 depicts a chart for explaining storage of data in the RAM of the direct printer according to this embodiment.

FIG. 12 depicts a chart for explaining the duplicated image print flag and the number of duplicated images stored in the RAM 113.

As shown in FIG. 12, the storage areas for a duplicated image print flag and the counted number of duplicated images are provided for each basic image.

If no duplicated image is found for the basic image in step S404, the flow advances to step S409. In step S409, the duplicated image print flag and the number of duplicated images corresponding to the basic image are cleared, and it is determined whether there is any more target basic image in the basic image list 501. If any target basic image is found, the flow advances to step S410 to set the basic image as the image to be laid out. After the image to be laid out is updated, the flow advances to step S403 to repeat the above-mentioned procedure. If no basic image is found in step S409, all image data stored in the external storage device 1006 and memory card 1007 have been arranged in the layout. The layout process ends.

With the above-mentioned procedure, the layout data for one print job can be generated.

FIG. 7 is a chart for explaining the layout data.

As shown in FIG. 7, a print page position (e.g., 1-Page or 2-Page), a matrix position corresponding to a layout position (e.g., (line, column) (1,1)), a basic image path representing the name of image data to be printed, the number of duplicated images for each image, and the paths to the duplicated image files (if any duplicated image exists) are set. In this example, the image 503 in FIG. 5 is laid out at a position (1,1) of page 1, and the next image is laid out at a position (1,1) of page 2. It can be seen from FIG. 5 that an image (Ext/Img00.JPG) of the external storage device 1006 is a duplicate of the image 503. In this case, the number of the duplicated image of the image 503 (CARD/Img00.JPG) is set to be "1" and the file path of the duplicated image 504 is set as "EXT/img00.JPG" as shown in FIG. 7.

Figure 8:
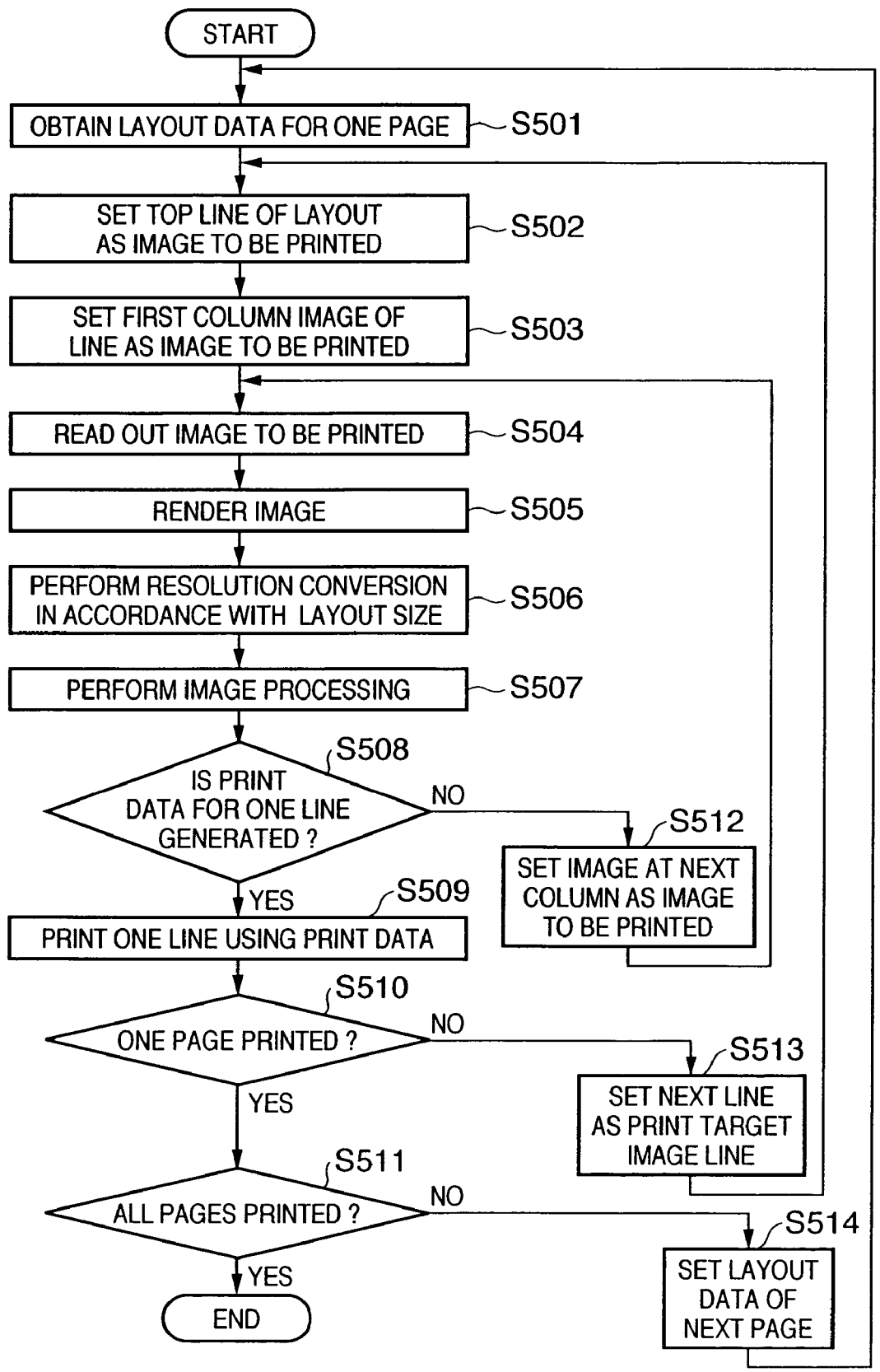
FIG. 8 is a flowchart showing the procedure for performing printing using the layout data according to the first embodiment.

FIG. 8 is a flowchart for explaining the procedure for performing a print job based on the layout data generated in the above-mentioned manner. A program for executing the process is stored in the ROM 112 and is executed under the control of the CPU 111.

In step S501, one page of the layout data generated in the above-mentioned procedure is obtained. In this flowchart, one page is printed on the basis of the layout data. In step S502, the top line out of the one-page layout is set as a print target image line. In this embodiment, layout printing is performed on a line-by-line basis. The present invention, however, is not limited to this, and layout printing can be performed on a page-by-page basis or band-by-band basis. In step S503, the image the first column of the print target image line is set as an image to be printed. In step S504, the image to be printed is read out from the memory card 1007 or the external storage device 1006 connected to the direct printer. In this example, an image to be read out is determined on the basis of the layout data generated by the process shown in the flowchart of FIG. 6. For this reason, a plurality of duplicated images are not printed. The flow advances to step S505 to render the readout image data into image data, for example bit-map image data. Rendering of image data is performed using a known technique, and a description thereof will be omitted.

The flow advances to step S506 to perform a resolution conversion process so as to adapt the rendered image data to the layout size. In step S507, an image process is performed to generate print data for the data laid out to the layout size. This image process includes color processing for adapting a color of image data to a type of printing sheet, binarization processing for generating binary data and the like. A description of the processes will be omitted. In step S508, it is determined whether all print data for the print target image line have been generated. If all print data have not been generated, the flow advances to step S512. In step S512, an image at the next column of the print target image line is set as the image to be printed, and the flow returns to step S504. In step S504, the above-mentioned print data generation procedure (steps S504 to S507) is performed.

If it is determined in step S508 that all print data for the print target image line have been generated, the flow advances to step S509 to print print data for the print target image line. In step S510, it is determined whether print data for one page has been generated and printed. If NO in step S510, the flow advances to step S513. In step S513, the next print target image line is set, and the flow returns to step S502. The procedure for generating and printing print data for each line (steps S503 to S509) is repeated.

If YES in step S510, the flow advances to step S511 to determine whether all pages have been printed. If YES in step S510, the process ends. On the other hand, if NO in step S510, the flow advances to step S514. In step S514, the layout data for the next page is set, and the flow advances to step S501. By repeating the above-mentioned procedure, the next page can be printed using the corresponding layout data.

With the above-mentioned procedure, all images can be printed while printing only one of duplicated images.

Figure 9:
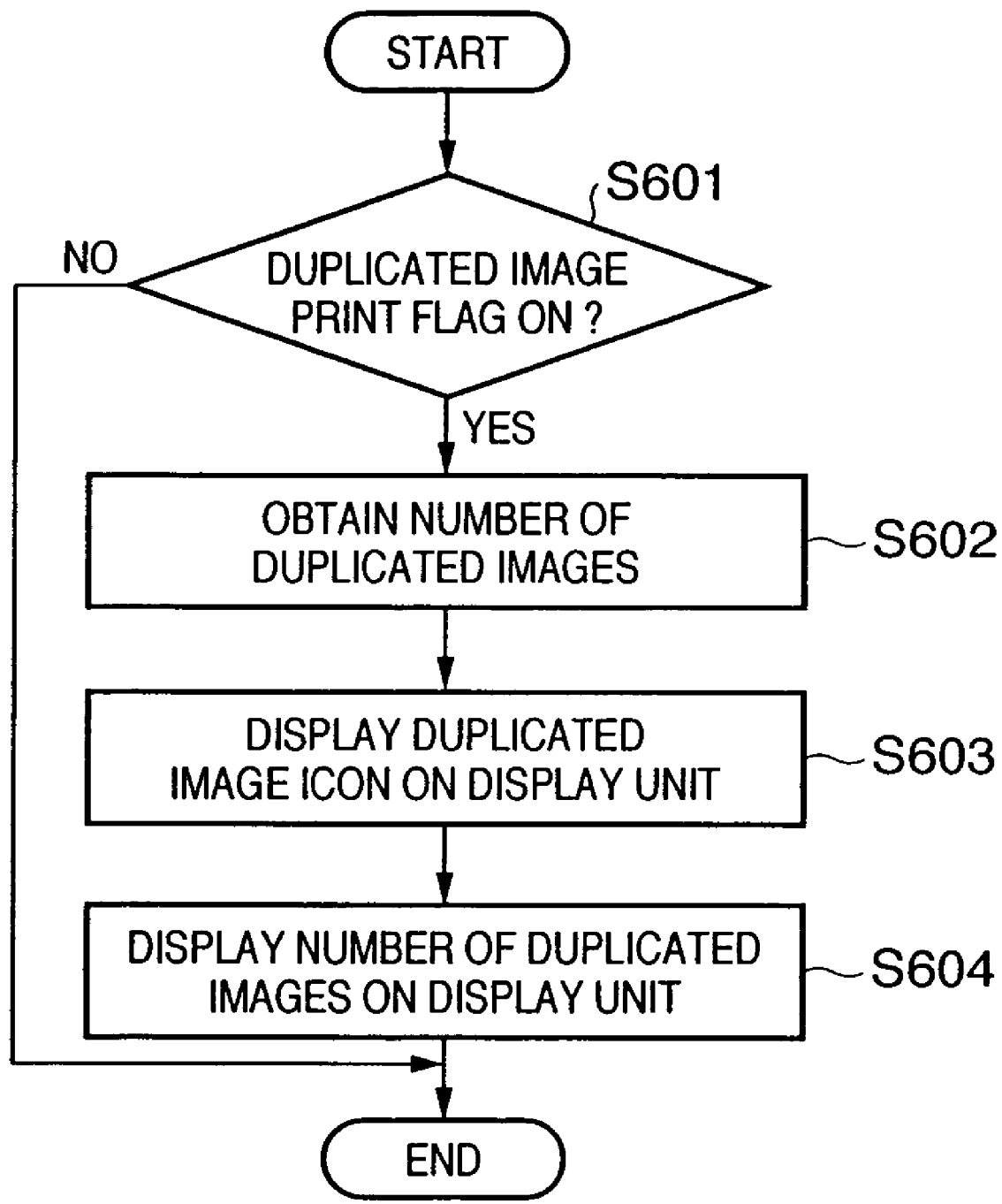
FIG. 9 is a flowchart showing the procedure for displaying a message indicating that duplicated images are not printed according to the first embodiment.

FIG. 9 is a flowchart for explaining a process of displaying the number of duplicated images and an icon indicating that duplicated images exist and are not printed on the display unit 1004. A program for executing the process is stored in the ROM 112 and is executed under the control of the CPU 111.

In step S601, it is determined whether a duplicated image print mode flag set during the layout process is ON. If ON, the flow advances to step S602. In step S602, it is determined that duplicated images are not printed, and the counted number of the duplicated images is obtained. As described with reference to FIG. 12, the number of the duplicated images is determined on the basis of the flag and the number of the duplicated images stored in the RAM 113. In step S603, an icon indicating that the duplicated images exist and are not printed is displayed on the display unit 1004 of the direct printer 1001. In step S604, the number of the duplicated images is displayed on the display unit 1004.

If the duplicated image flag is OFF in step S601, there is no duplicated image, and normal printing is performed. In this case, the icon and number of the duplicated image are not displayed on the display unit 1004, and the process ends.

Figure 10:
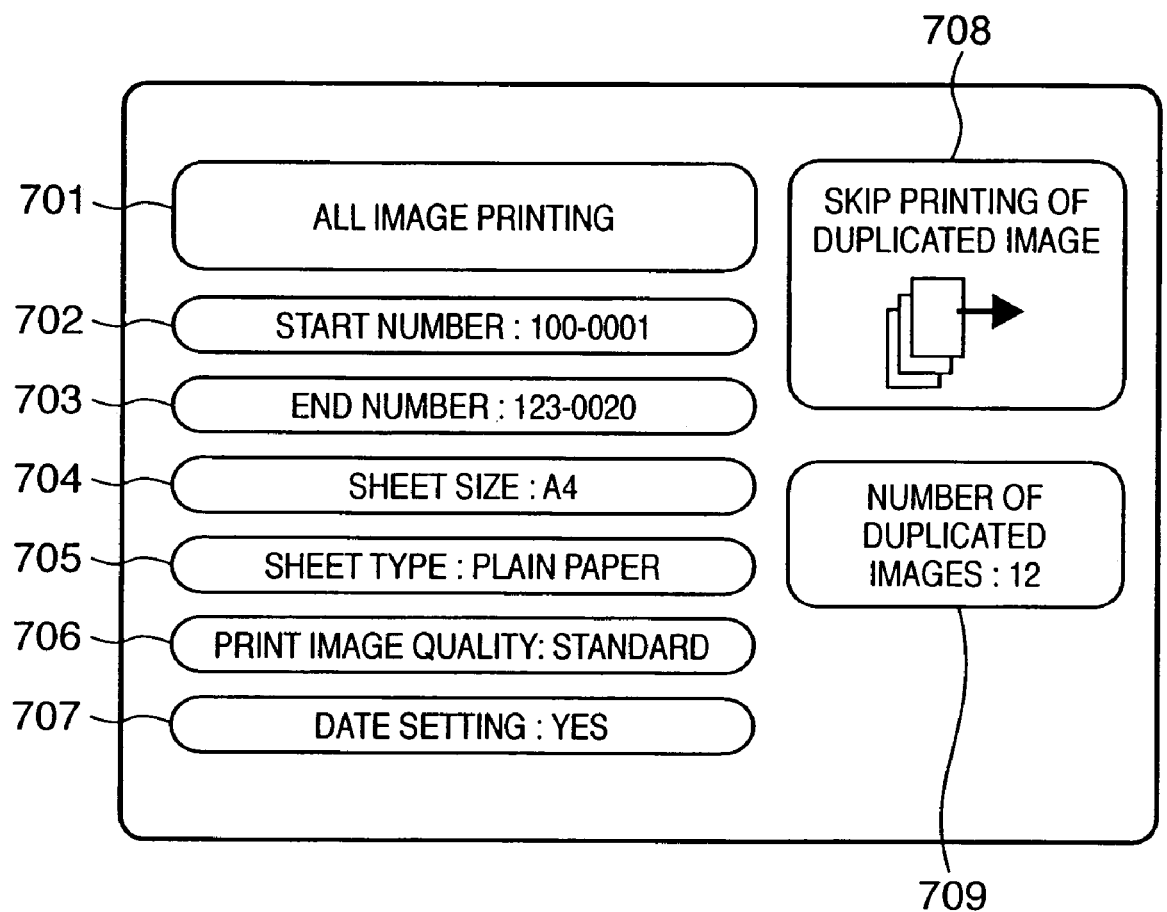
FIG. 10 depicts a view showing a display example when duplicated images are not printed according to the first embodiment.

FIG. 10 depicts a view showing a display example on the display unit 1004 in the flowchart of FIG. 9.

FIG. 10 shows a print mode display 701 indicating the current print mode (in this example, "all image printing"), a start number display 702 indicating the image number (ID) of the top image, an end number display 703 indicating the image number (ID) of the last image, a paper size display 704 indicating the size of a printing paper (in this example, "A4"), a sheet type display 705 indicating the type of the printing sheet (in this example, "plain paper"), a print image quality display 706 indicating the print image quality (in this example, "standard"), a date setting 707 indicating the presence/absence of printing date (in this example, "YES"), a duplicated image skip print icon 708 indicating that duplicated images exist and are not printed in the above-mentioned procedure, and the number display 709 of the duplicated images indicating the number of all duplicated images.

As described above, according to the first embodiment, if an instruction to print all images stored in the external storage device 1006 and/or memory card 1007 is issued, even if duplicated images exist, only one of the duplicated images can be printed. Further, if there are duplicated images, contents indicating that duplicated images exist and are not printed can be displayed on the display unit 1004 using the icon and the counted number of the duplicated images.

Second Embodiment

The second embodiment will describe a method of printing not only an image of duplicated images but also an explicit message for indicating whose duplicated image exist in index printing in which a list of image data stored in an external storage device 1006 and memory card 1007 which include duplicated image data.

Figure 13:
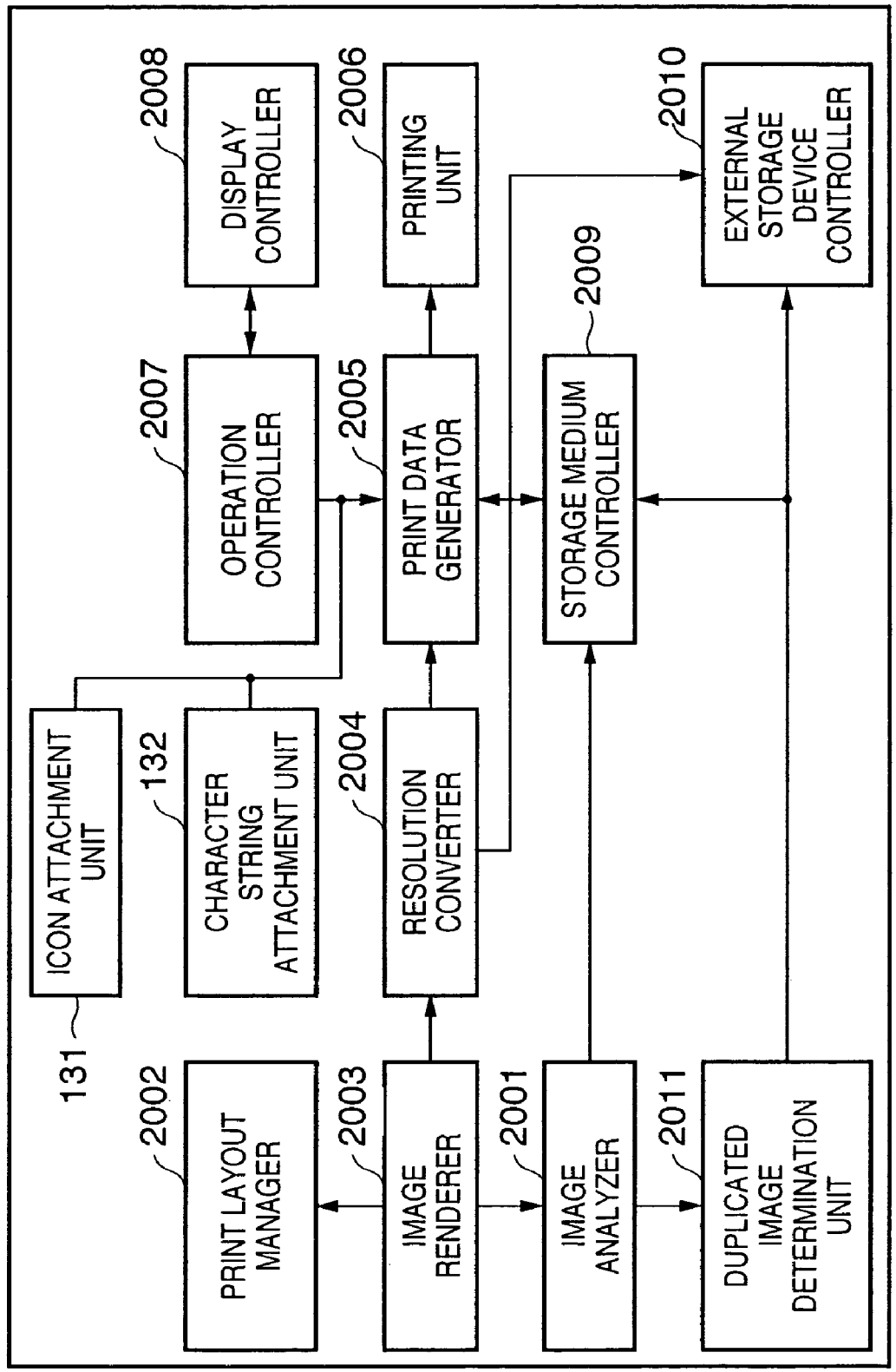
FIG. 13 is a functional block diagram for explaining the functional arrangement of a direct printer according to the second embodiment of the present invention.

FIG. 13 is a block diagram for explaining the functional arrangement of a direct printer according to the second embodiment of the present invention. The same reference numerals as in FIG. 13 denote the same parts as those in FIG. 2, and a description thereof will be omitted. A direct printer 1001 according to the second embodiment has the same arrangement as that in the first embodiment, and a description thereof will be omitted.

In FIG. 13, an icon attachment unit 131 attaches, to an image, an icon which symbolizes a duplicated image to print the icon. A character string attachment unit 132 attaches a character string corresponding to the icon which symbolizes a duplicated image. The arrangement of the units 131 and 132 is achieved by a CPU 111 and a program stored in a ROM 112.

A method of adding and printing an icon which symbolizes a duplicated image and the full path of a duplicated image at the time of index printing will be described next. At the start of printing or when the memory card 1007 is inserted or the external storage device 1006 is connected to the direct printer 1001, as described in the first embodiment, a duplicated image list is generated. Since a method of generating the duplicated image list has been described in the first embodiment, a description thereof will be omitted. A method of generating layout data is the same as that in the first embodiment, and a description thereof will be omitted.

FIG. 14 depicts a chart for explaining layout data when a plurality of images are printed on one page in index printing according to the second embodiment of the present invention.

In this example, index images of the basic image list shown in FIG. 5 are laid out in one page. A number of the duplicated images and file paths (corresponding in the number to duplicated images) are stored for each index image.

Figure 15:
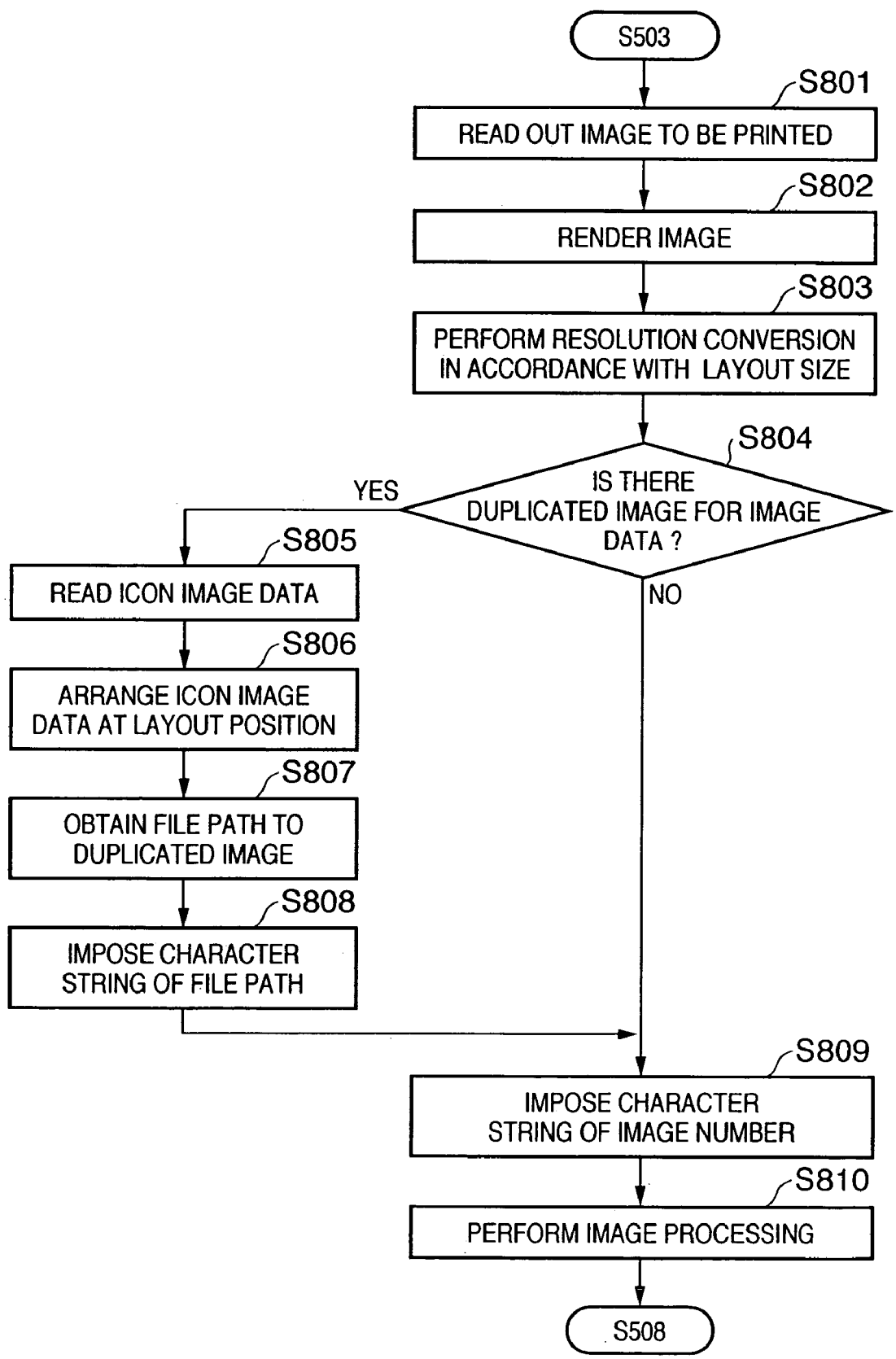
FIG. 15 is a flowchart showing the procedure for generating image data in index printing indicating that there are duplicated images according to the second embodiment.

FIG. 15 is a flowchart for explaining the procedure for printing according to the second embodiment. A procedure for obtaining laid-out image data and a basic procedure for printing in FIG. 15 are the same as that shown in the flowchart of FIG. 8 according to the first embodiment, a process which corresponds to but is different from the process in steps S504 to S507 will be described. A program for executing the process is also stored in the ROM 112 and is executed under the control of the CPU 111.

The process starts by setting the top (the first column) image of a line as an image to be printed. In step S801, the image to be printed having undergone a layout process is read out. In step S802, the readout image data is rendered into bit-mapped image data. In step S803, the rendered image data is subjected to resolution conversion so as to adapt the image data to a layout size. In step S804, it is determined whether the identical image (duplicated image) for the image to be printed exists. If any duplicated image for the image data exists, the flow advances to step S805. In step S805, the image data of an icon which symbolizes the duplicated image is read out to print the icon. The image data of the icon is stored in, e.g., the ROM 112. In step S806, the readout icon image data is arranged in accordance with the layout of the previously rendered print image data (icon attachment unit 131). At this time, the icon can freely be arranged (e.g., overlaid on the image to be printed or arranged near the image) as far as there is a one-to-one correspondence between the image data and the layout position. In step S807, a file path to the duplicated image is obtained. In step S808, the character string attachment unit 132 imposes the obtained file path at a layout position corresponding to the image to be printed (see FIG. 16).

With the above-mentioned procedure, an image to be printed can be printed while attaching the icon indicating the presence of the duplicated image and the file path to the duplicated image to the image to be printed.

In step S809, a character string indicating the image number (ID) of the index image is imposed. The flow advances to step S810. In step S810, the image including attached icon data and character string is subjected to image processing. The flow advances to step S508 in FIG. 8 so as to print the image data.

With the above-mentioned procedure, print data including icon image data and a file path name of a duplicated image can be generated.

If it is determined in step S804 that no identical image (duplicated image) exists, the flow advances to step S809. In step S809, icon data which symbolizes a duplicated image and a character string representing the file path name of the duplicated image are not attached, and only a character string representing the index image number (ID) is imposed. In step S810, image processing is performed to generate print data, then advance to the step 508.

With this procedure, if a duplicated image exists, print data in which the icon data and the file path to the duplicated image are attached to an image to be printed is generated. By continuing the procedure in FIG. 8, index printing can be performed.

FIG. 16 depicts a view showing a print example in index printing according to the second embodiment.

In this example, a basic image 901 of a duplicated image, an icon 902 indicating that a duplicated image of the image 901 exists, a number 903 of the duplicated image, and a duplicated file path name 904 are printed. If the number of the duplicated images is two or more, a basic image 906, a number 907 of the duplicated images for the image 906, and file path names 908 to the duplicated images corresponding in the number of the duplicated images are printed. If no duplicated image for an image exists, only a basic image and the index image number of the basic image are printed, as shown in a case of the basic image 905.

With the above-mentioned procedure, in index printing for all images stored in the memory card 1007 and/or external storage device 1006, if there is any duplicated image for an image, an icon indicating the presence of the duplicated image, the counted number of the duplicated images, and the file path to the duplicated image can be printed. The second embodiment has described a case wherein an index image is printed. Alternatively, such index image may be displayed on a display unit 1004. As information indicating a duplicated image, at least one of the icon, the number of the duplicated image, and file path to the duplicated image may be displayed.

Other Embodiment

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit. For example, execution of the processing by drivers on a PC corresponds to such case.

The above-mentioned embodiments have described a case of printer apparatus. The present invention is not limited to this. For example, it may be determined whether there is any duplicated image among images stored in a hard disk of a PC (information processing apparatus) or the like. If there is any duplicated image, information explicitly indicating duplication may be displayed or printed. Alternatively, the present invention may also be applied to the following case. More specifically, a digital camera is connected to the PC. It is checked whether there is any duplicated image between the hard disk of the PC and a memory card of the digital camera. Printing or display is performed in accordance with the check result.

As described above, according to this embodiment, duplicated images among image data stored in an external storage device connected to a direct printer and/or memory card are determined, and only one (less than the number of the duplicated images) of the duplicate images is printed. For this reason, all images can be printed without any omission and duplication, and printing sheets are not wasted.

When duplicated images are printed by less than the number of duplicated images, an icon and the number are displayed on the display unit of the direct printer. Accordingly, it can easily be confirmed that the duplicated images exist and are not printed. Even if the number of the printed images does not coincide with the number of all images stored in the external storage medium and/of recording medium, the user does not feel insecure.

In index printing (display), both a basic image and an icon indicating that a duplicated image (identical image) of the basic image are printed or displayed. Accordingly, the presence of a duplicated image can easily be confirmed.

Since both a basic image and the number of duplicated images of the basic image are printed (displayed), the number of the duplicated images can easily be confirmed. Since the full path to each duplicated image is printed (displayed), it can easily be confirmed which image in which storage unit (folder) is the duplicated image. This makes it possible to increase the convenience of the user.

The present invention is not limited to the above embodiments, and various changes and modifications can be made thereto within the spirit and scope of the present invention. Therefore, to apprise the public of the scope of the present invention, the following claims are made.

CLAIM OF PRIORITY

This patent application claims priority from Japanese Patent Application No. 2004-000505 filed on Jan. 5, 2004, which is hereby incorporated by reference.

What is claimed is:

1. A printing apparatus for printing an image stored in a mounted storage medium, comprising:
   an external interface unit configured to connect to an external storage device;
   a determination unit configured to determine whether or not a second image being a duplicate of a first image is stored in the storage medium and/or an external storage device, in a case where the external storage device is connected to the printing apparatus;
   printing inhibition unit configured to inhibit printing of the second image determined by said determination unit, in a case of printing images stored in the external storage device and/or the storage medium;

an image processing unit configured to read out image data of images to be printed except for the second image inhibited by said printing inhibition unit from the external storage device and/or the storage medium and convert the image data to generate print data; and a first printing unit configured to print in accordance with the print data generated by said image processing unit.

2. The apparatus according to claim 1, wherein the printing image is index printing.

3. The apparatus according to claim 1, further comprising a display unit configured to indicate that the second image exists, in a case where said determination unit determines that the second image is stored.

4. The apparatus according to claim 3, further comprising a count display control unit configured to display the number of the second images, in a case where said determination unit determines that the second image is stored.

5. The apparatus according to claim 1, further comprising a duplicated printing control unit configured to print data indicating that the second image being a duplicate of the first image exists while associating the data with the first image, in a case where said determination unit determines that the second image is stored.

6. The apparatus according to claim 5, further comprising a count printing control unit configured to print the number of the second image being a duplicate of the first image while associating the count with the first image, in a case where said determination unit determines that the second image is stored.

7. The apparatus according to claim 5, further comprising a second printing unit configured to print a file path to the second image being a duplicate of the first image while being associated with the first image, in a case where said determination unit determines that the second image is stored.

8. A printing control method in a printing apparatus for printing an image stored in a mounted storage medium, comprising:

a determination step of determining whether or not a second image being a duplicate of a first image is stored in the storage medium and/or external storage device, in a case where an external storage device is connected to the printing apparatus;

a printing inhibition step of inhibiting printing of the second image determined in said determination step, in a case of printing images stored in the external storage device and/or storage medium;

an image processing step of reading out image data of images to be printed except for the second image inhibited in said printing inhibition step from the external storage device and/or storage medium and convening the image data to generate print data; and a printing step of printing in accordance with the print data generated in said image processing step.

9. The method according to claim 8, wherein the printing of images is index printing.

10. The method according to claim 8, further comprising a display control step of indicating that the second image exists, in a case where it is determined in said determination step that the second image is stored.

11. The method according to claim 10, further comprising a count display control step of displaying the number of the second images, in a case where it is determined in said determination step that the second image is stored.

12. The method according to claim 8, further comprising a duplicated printing control step of printing data indicating that the second image while associating the data with the first image, in a case where it is determined in said determination step that the second image is stored.

13. The method according to claim 12, further comprising a count printing control step of printing the number of the second images while associating the count with the first image, in a case where it is determined in said determination step that the second image is stored.

14. The method according to claim 12, further comprising a step of printing a file path to the second image while being associated with the first image, in a case where it is determined in said determination step that the second image is stored.

15. A computer-readable storage medium for storing a program for causing a computer to execute a printing control method defined in claim 8.

* * * * *